(12) United States Patent
Hoog

(10) Patent No.: US 9,081,838 B2
(45) Date of Patent: Jul. 14, 2015

(54) METHODS, APPARATUSES, AND COMPUTER PROGRAM PRODUCTS FOR DATABASE RECORD RECOVERY

(75) Inventor: Andrew W. Hoog, Oak Park, IL (US)

(73) Assignee: viaForensics, LLC, Oak Park, IL (US)

( * ) Notice: Subject to any disclaimer, the term of this patent is extended or adjusted under 35 U.S.C. 154(b) by 424 days.

(21) Appl. No.: 13/152,809

(22) Filed: Jun. 3, 2011

(65) Prior Publication Data

US 2012/0310895 A1  Dec. 6, 2012

(51) Int. Cl.
  *G06F 7/00* (2006.01)
  *G06F 17/00* (2006.01)
  *G06F 17/30* (2006.01)

(52) U.S. Cl.
  CPC ................ *G06F 17/30569* (2013.01)

(58) Field of Classification Search
  CPC . G06F 17/30; G06F 17/30569; G06F 3/0661; G06F 17/30005
  See application file for complete search history.

(56) References Cited

U.S. PATENT DOCUMENTS

| 7,793,283 B2 * | 9/2010 | Moriyama et al. ............ 717/173 |
| 2005/0157707 A1 * | 7/2005 | Sternagle .................... 370/352 |
| 2006/0064429 A1 * | 3/2006 | Yao .............................. 707/101 |
| 2008/0045205 A1 * | 2/2008 | Park et al. .................. 455/422.1 |
| 2008/0281836 A1 * | 11/2008 | Dykstra-Erickson et al. ............................. 707/100 |
| 2009/0319550 A1 | 12/2009 | Shau et al. |
| 2010/0125697 A1 * | 5/2010 | Lee et al. ...................... 711/103 |

OTHER PUBLICATIONS

PCT International Search Report for Application PCT/US2012/040450 mailed Sep. 17, 2012.
Embley et al., "Automating the extraction of data from HTML tables with unknown structure," Data & Knowledge Engineering, Elsevier, BV, NL, vol. 54 (No. 1): pp. 3-28, (Jul. 1, 2005).
Bachmann et al., "Xbase Data file (*.dbf)," Internet article (Feb. 27, 2010).

* cited by examiner

*Primary Examiner* — Azam Cheema
(74) *Attorney, Agent, or Firm* — Alston & Bird LLP

(57) ABSTRACT

Methods, apparatuses, and computer program products are provided for database record recovery. A method may include determining a target database record format. The method may further include using the target database record format to evaluate source data for presence of database records matching the target database record format. The method may additionally include, in an instance in which a database record is determined, based on the evaluation, to be present in the source data, recovering the database record from the source data. Corresponding apparatuses and computer program products are also provided.

17 Claims, 7 Drawing Sheets

METHODS, APPARATUSES, AND COMPUTER PROGRAM PRODUCTS FOR DATABASE RECORD RECOVERY

TECHNOLOGICAL FIELD

Embodiments of the present invention relate generally to computing technology and, more particularly, relate to methods, apparatuses, and computer program products for database record recovery.

BACKGROUND

Digital forensics, also known as computer forensics, is generally concerned with evidence of activities or occurrences on digital systems. This evidence may be found by examining storage media (e.g. hard disk drives) and/or memory (e.g. RAM). In this regard, digital forensics techniques may be applied to identify, examine, and analyze forensic data in a manner that may preserve the integrity of the information and maintain a strict chain of custody for the data. Analysis of forensic data may be used to support the investigation of crimes, violations of policies, security incidents, reviews of operational problems, and recovery from accidental system damage.

Forensic investigations often involve recovery or attempted recovery of allocated (e.g., non-deleted) and unallocated (e.g., deleted) files in a variety of formats. Various database file formats, such as SQLite, that are frequently used by computer programs on mobile devices such as smart phones, as well as computers, laptops, and other computers to store and organize data are of particular importance to many forensic investigations. For example, database records may be used to store a variety of functional data, including text messages, multimedia messages, email messages, call history entries, contact records, and the like. Such functional data records are often of great value in forensic investigations. As such, the ability to recover database records containing functional data may be of particular value for use in support of criminal investigations, civil litigation, corporate electronic discovery (e-discovery), and the like.

BRIEF SUMMARY OF SOME EXAMPLES OF THE INVENTION

Methods, apparatuses, and computer program products are provided herein for database record recovery. Some example embodiments disclosed herein may provide several advantages for digital forensics analysts, attorneys, computing device users, and computing devices. In this regard, some example embodiments enable the recovery of individual database records, such as SQLite database records, that may be of value in forensic investigations from source data. More particularly, some example embodiments evaluate source data for data portions matching a target database record format and, if a match is found, recover a database record or fragment thereof from the source data. The use of a target database record format for evaluation of source data in accordance with some example embodiments may facilitate recovery of database records without requiring a presence of a complete and valid database or database header. Accordingly, some example embodiments may facilitate recovery of a greater number of database records and record fragments than methods relying on the presence of a complete and valid database file. Further, some example embodiments compare a target database record format to a portion of source data to determine whether the target database record format matches the portion of source data to the satisfaction of a threshold confidence level. Accordingly, some example embodiments may recover database records that are not a precise match to the target database record format, enabling recovery of similarly formatted records, record fragments, and records that have been partially corrupted. The additional recovered record data that may be provided by some example embodiments may accordingly provide additional evidence for forensic investigators that may aid in their investigations.

In a first example embodiment, a method is provided. The method of this example embodiment may comprise determining a target database record format. The method of this example embodiment may further comprise using the target database record format to evaluate source data for presence of database records matching the target database record format. In an instance in which a database record is determined, based on the evaluation, to be present in the source data, the method of this example embodiment may also comprise recovering the database record from the source data.

In another example embodiment, an apparatus comprising at least one processor is provided. The at least one processor may be configured to cause the apparatus of this example embodiment to determine a target database record format. The at least one processor may be further configured to cause the apparatus of this example embodiment to use the target database record format to evaluate source data for presence of database records matching the target database record format. The at least one processor may be additionally configured to cause the apparatus of this example embodiment, in an instance in which a database record is determined, based on the evaluation, to be present in the source data, to recover the database record from the source data.

In a further example embodiment, a computer program product comprising at least one non-transitory computer-readable storage medium having computer-readable program instructions stored therein is provided. The program instructions of this example embodiment may comprise program instructions configured to determine a target database record format. The program instructions of this example embodiment may further comprise program instructions configured to use the target database record format to evaluate source data for presence of database records matching the target database record format. The program instructions of this example embodiment may additionally comprise program instructions configured, in an instance in which a database record is determined, based on the evaluation, to be present in the source data, to recover the database record from the source data.

In another example embodiment, an apparatus is provided. The apparatus of this example embodiment may comprise means for determining a target database record format. The apparatus of this example embodiment may further comprise means for using the target database record format to evaluate source data for presence of database records matching the target database record format. The apparatus of this example embodiment may also comprise means for, in an instance in which a database record is determined, based on the evaluation, to be present in the source data, recovering the database record from the source data.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
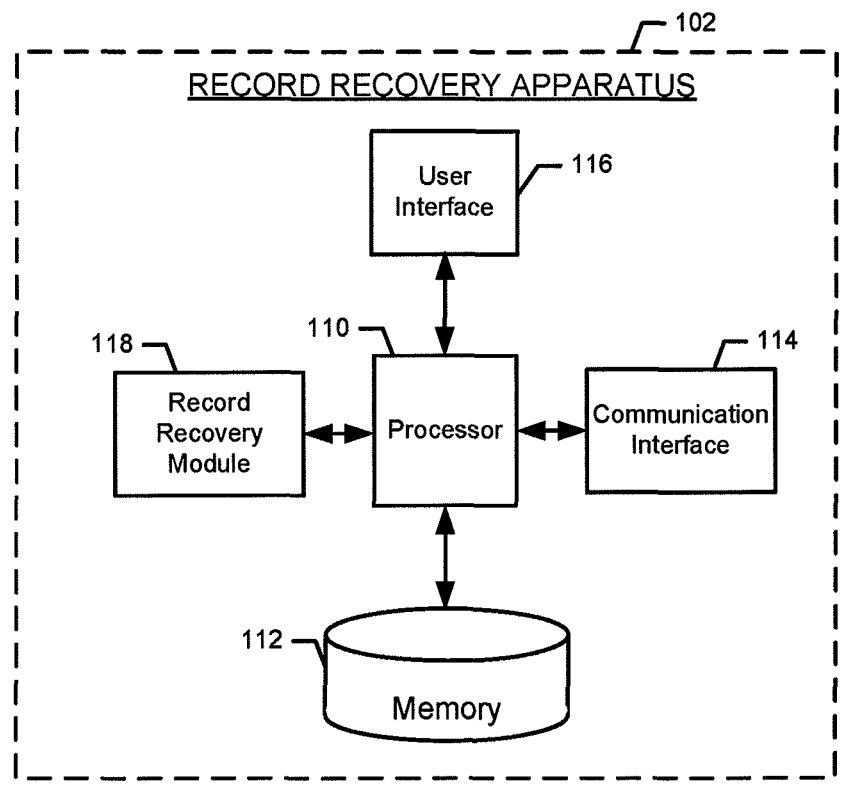
Figure 2:
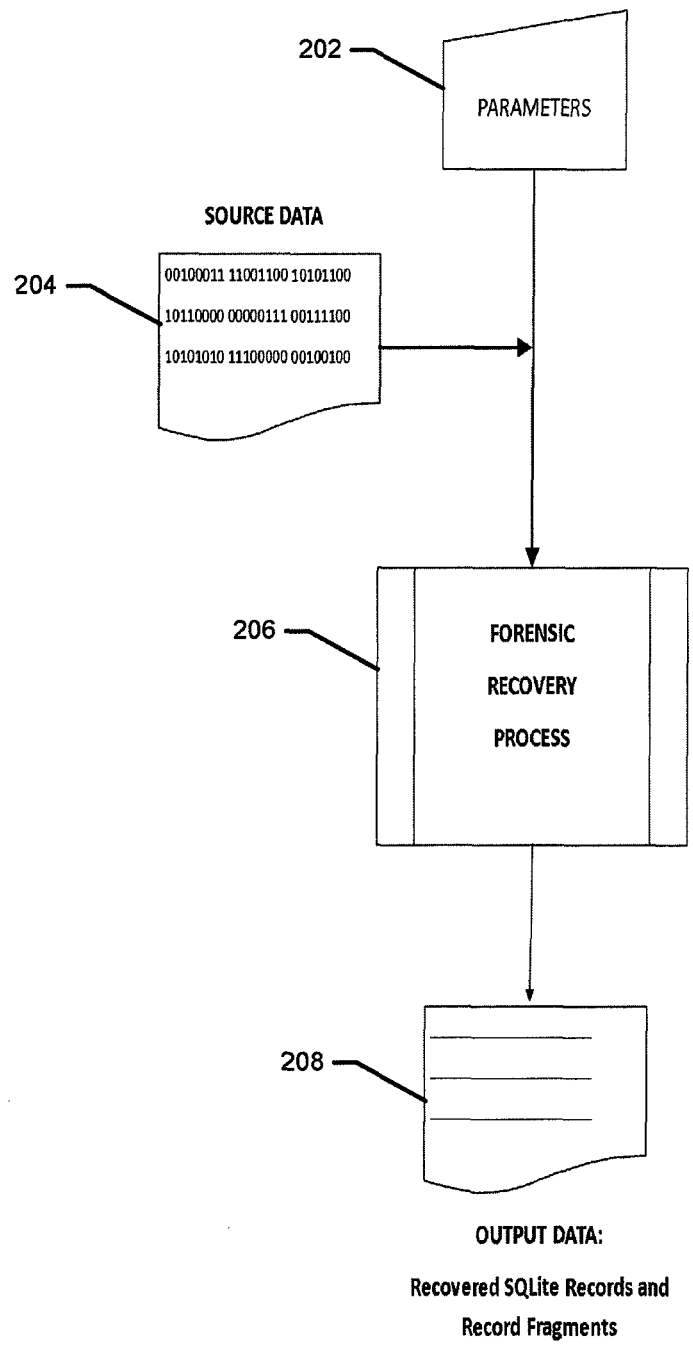
Figure 3:
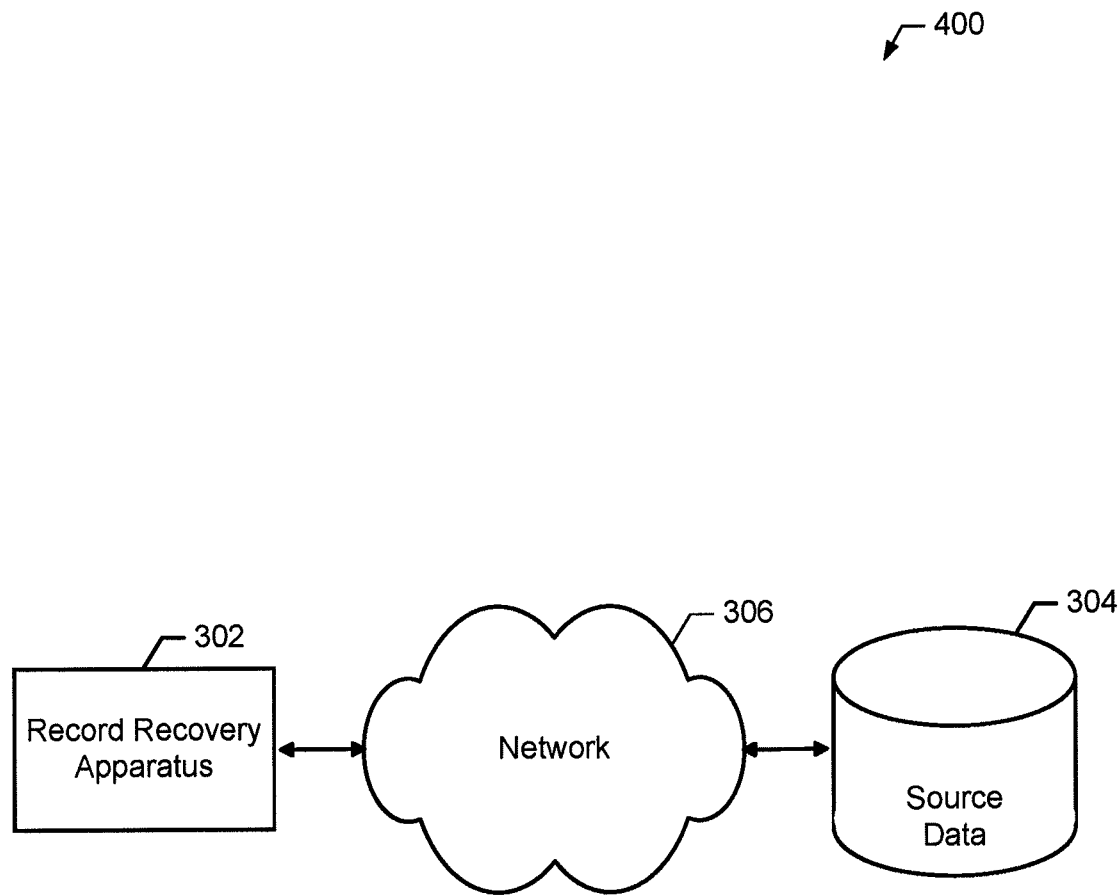
Figure 4:
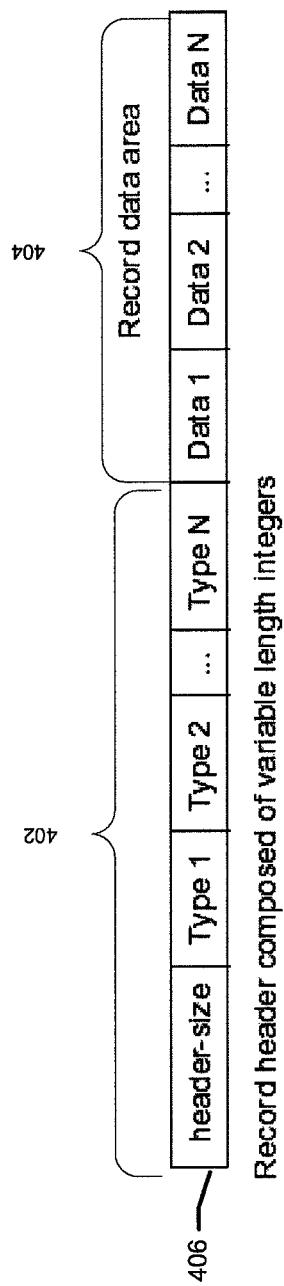
Figure 5:
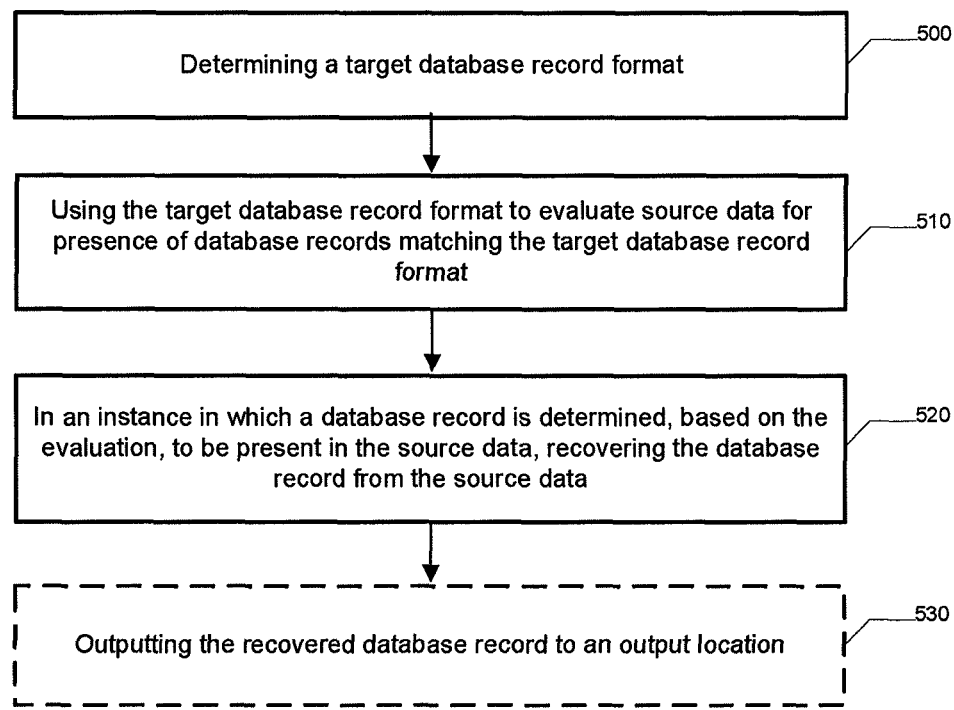
Figure 6:
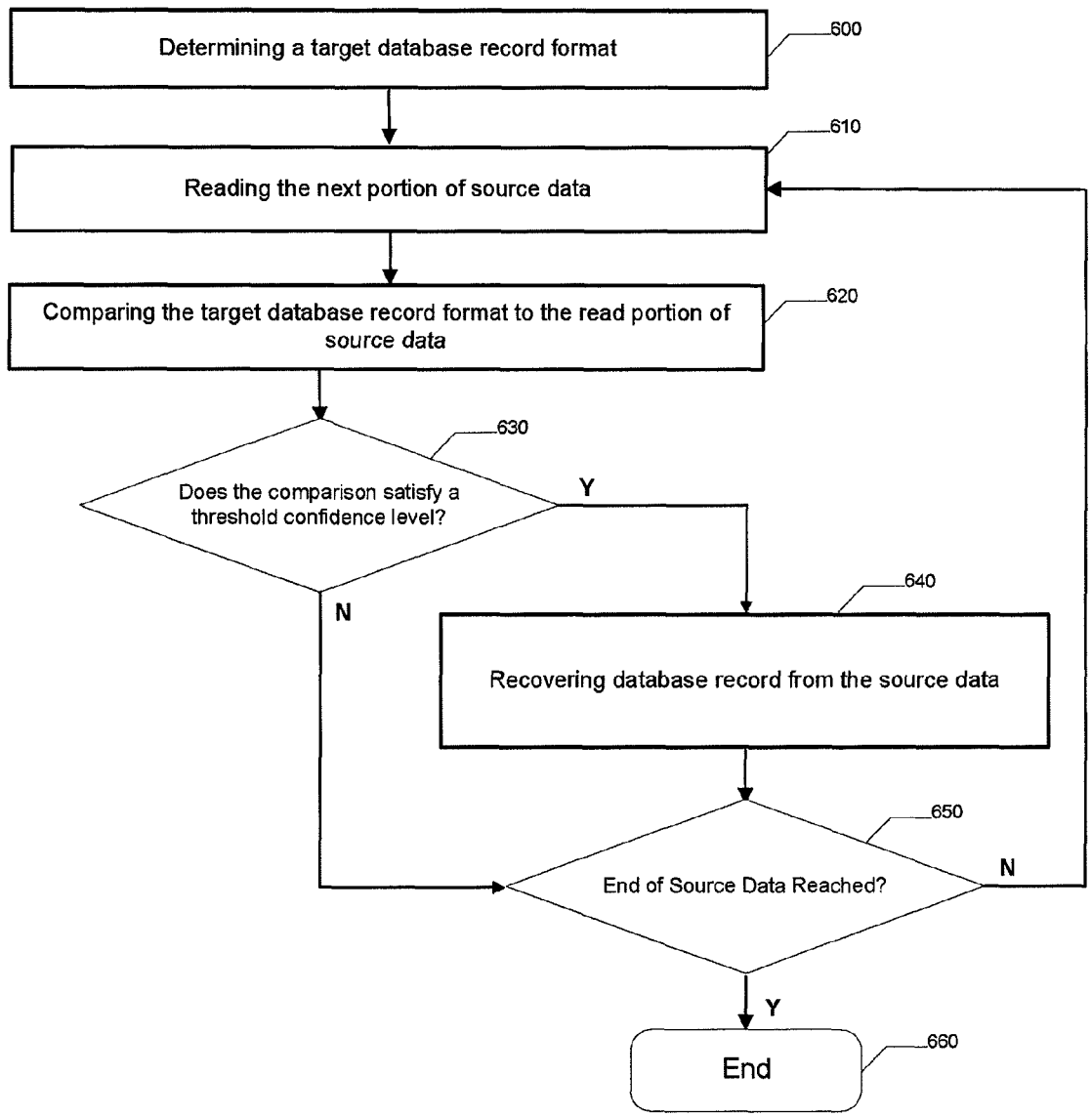
Figure 7:
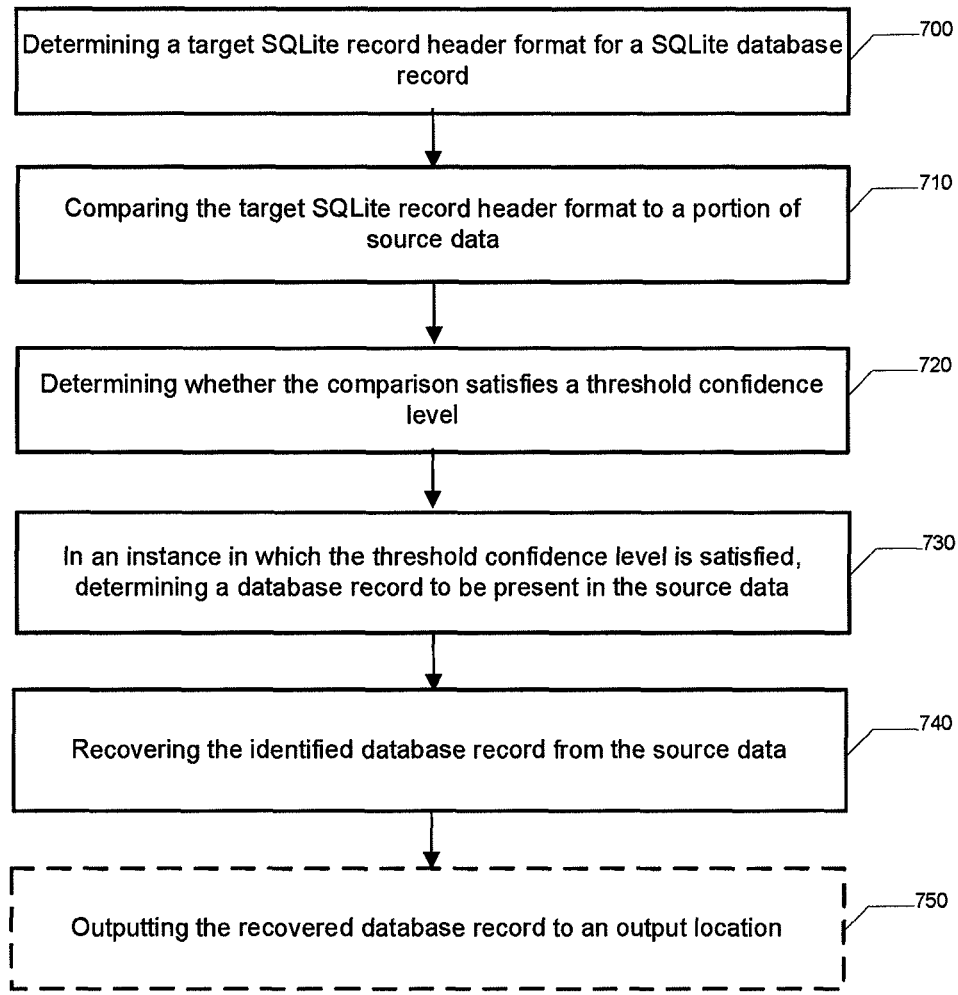

Having thus described embodiments of the invention in general terms, reference will now be made to the accompanying drawings, which are not necessarily drawn to scale, and wherein:

FIG. 1 illustrates a block diagram of a record recovery apparatus according to some example embodiments;

FIG. 2 illustrates a process for recovering database records according to some example embodiments;

FIG. 3 illustrates a system for database record recovery according to some example embodiments;

FIG. 4 illustrates an example database record format in accordance with some example embodiments;

FIG. 5 illustrates a flowchart according to an example method for database record recovery according to some example embodiments;

FIG. 6 illustrates a flowchart according to another example method for database record recovery according to some example embodiments; and FIG. 7 illustrates a flowchart according to a further example method for database record recovery according to some example embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Complete and incomplete databases, as well as fragments and artifacts originally part of databases, regularly exist in data storage implemented on and/or used in digital devices. An incomplete database may be missing part of the database schema, or have other missing parts that prevent it from qualifying as a complete and valid database. In this regard, an incomplete database may have been corrupted, deleted, or the like. Computer programs intended to open databases and/or retrieve data from them generally do not work when the database file is incomplete. Accordingly, data recovery from source data having an incomplete database may be problematic, leaving forensic investigators without potentially key pieces of evidence in their investigations.

Further complicating data recovery is the fact that individual records within a database may be complete or incomplete. An incomplete record may be missing all or part of the record header and/or or all or part of the data area for that record. In some instances, an incomplete record may not prevent a database from being considered complete and valid. For example, an incomplete record may reside in unallocated space in the database file (e.g., deleted data). In this regard, data areas are often re-used within the file or on the disk, and parts of the record may be overwritten. Loading or otherwise recovering an incomplete record may, however, prove problematic, leaving forensic investigators without potentially key pieces of evidence in their investigations.

Some example embodiments disclosed herein may advantageously enable recovery of incomplete database records and/or records from incomplete databases. In this regard, some example embodiments facilitate recovery of database records without requiring presence of a complete database file and/or a complete database record header. Accordingly, such example embodiments may provide forensic analysts with additional data for analysis compared to existing data recovery methods. Further, such example embodiments may enable organizations to recover lost data.

Referring now to FIG. 1, FIG. 1 illustrates a block diagram of a record recovery apparatus 102 according to some example embodiments. The record recovery apparatus 102 may comprise any computing device or plurality of computing devices configured to perform database record recovery in accordance with one or more example embodiments. By way of non-limiting example, the record recovery apparatus 102 may comprise a desktop computer, laptop computer, server, mobile terminal, mobile computer, mobile phone, mobile communication device, game device, digital camera/camcorder, audio/video player, digital video recorder, personal digital assistant (PDA), a server, a server cluster, a cloud computing infrastructure, a distributed apparatus, multiple computing devices in communication with each other, any combination thereof, and/or the like.

In some example embodiments, the record recovery apparatus 102 may include various means for performing the various functions described herein. These means may include, for example, one or more of a processor 110, memory 112, communication interface 114, user interface 116, or record recovery module 118. The means of the record recovery apparatus 102 as described herein may be embodied as, for example, circuitry, hardware elements (e.g., a suitably programmed processor, combinational logic circuit, and/or the like), a computer program product comprising a computer-readable medium (e.g., memory 112) storing computer-readable program instructions (e.g., software or firmware) that are executable by a suitably configured processing device (e.g., the processor 110), or some combination thereof.

The processor 110 may, for example, be embodied as various means including one or more processors, one or more microprocessors, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 may comprise a plurality of processors. The plurality of processors may be embodied on a single computing device or may be distributed across a plurality of computing devices collectively configured to function as the record recovery apparatus 102. The plurality of processors may be in operative communication with each other and may be collectively configured to perform one or more functionalities of the record recovery apparatus 102 as described herein. In some example embodiments, the processor 110 is configured to execute instructions stored in the memory 112 and/or that are otherwise accessible to the processor 110. These instructions, when executed by the processor 110, may cause the record recovery apparatus 102 to perform one or more of the functionalities of the record recovery apparatus 102 as described herein. As such, whether configured by hardware or software methods, or by a combination thereof, the processor 110 may comprise an entity capable of performing operations according to one or more embodiments while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may include, for example, volatile and/or non-volatile memory. In this regard, the memory 112 may comprise a non-transitory computer-readable storage medium. Although illustrated in FIG. 1 as a single memory, the memory 112 may comprise a plurality of memories. The plurality of memories may be embodied on a single computing device or distributed across a plurality of computing devices. The memory 112 may comprise volatile memory, non-volatile memory, or some combination thereof. In this regard, the memory 112 may comprise, for example, a hard disk, random access memory, cache memory, flash memory, an optical disc (e.g., a compact disc read only memory (CD-ROM), digital versatile disc read only memory (DVD-ROM), and/or the like), circuitry configured to store information, or some combination thereof. The memory 112 may be configured to store information, data, applications, instructions, or the like for enabling the record recovery apparatus 102 to carry out various functions in accordance with example embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. This stored information may be stored and/or used by the record recovery module 118 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another device, such as, a forensic analysis apparatus 104. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver, a network interface card, and/or supporting hardware or software for enabling communications with another computing device. The communication interface 114 may be configured to receive and/or transmit data using any protocol that may be used for communications between computing devices via a wireline connection, wireless connection, network connection, and/or the like. As an example, the communication interface 114 may be configured to receive and/or transmit data using any protocol that may be used for communication over the network 306 illustrated in FIG. 3. The communication interface 114 may additionally be in communication with the memory 112, user interface 116, and/or record recovery module 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. Accordingly, the user interface 116 may provide means for a user to interact with and/or to otherwise engage in activity on the record recovery apparatus 102, such as by inputting data to the record recovery apparatus 102, viewing data output by the record recovery apparatus 102, and/or the like. The user interface 116 may be in communication with the memory 112, communication interface 114, and/or record recovery module 118, such as via a bus.

The record recovery module 118 may be embodied as various means, such as circuitry, hardware, a computer program product comprising a computer-readable medium (e.g., memory 112) storing computer-readable program instructions (e.g., software or firmware) that are executable by a suitably configured processing device (e.g., the processor 110), or some combination thereof and, in some example embodiments, is embodied as or otherwise controlled by the processor 110. In embodiments wherein the record recovery module 118 is embodied separately from the processor 110, the record recovery module 118 may be in communication with the processor 110. The record recovery module 118 may further be in communication with one or more of the memory 112, communication interface 114, or user interface 116, such as via a bus.

In some example embodiments, the record recovery module 118 may be configured to perform a database record recovery process. In some example embodiments, the database record recovery process may comprise a forensic recovery process that may facilitate recovery of forensic data while preserving the original source data. Referring now to FIG. 2, FIG. 2 illustrates an overview of an example process for recovering database records that may be performed and/or controlled by the record recovery module 118 according to some example embodiments. Recovery of database records may be performed in accordance with a set of parameters 202. The set of parameters 202 may be determined by the record recovery module 118 during an initiation process prior to database record recovery, and may comprise predefined parameters, user defined parameters, parameters derived by the record recovery module 118 on the basis of the type of source data 204 being evaluated, parameters derived by the record recovery module 118 on the basis of the type of database records to be recovered, some combination thereof, or the like. The initiation process may, for example, be performed responsive to initiation of a forensic recovery program, in response to manual user input, in accordance with a pre-scheduled (e.g., automated) data recovery, or the like.

By way of non-limiting example, the set of parameters 202 may include the location of the source data 204, a threshold confidence level that may be used in evaluating whether a database record is present in the source data, a target database record format, a location to which to output recovered database records, a format in which to output recovered database records, and/or the like.

The source data 204 may comprise any raw data, data file, memory, and/or the like which is to be evaluated for the presence of database records based on the set of parameters 202. Accordingly, the parameter set 202 may include a source data location parameter defining the location of the file, disk or other data source to be read and evaluated by the record recovery module 118. By way of example, the source data 204 may comprise a removable storage media, physical disk, a whole or partial disk image file (e.g., a dd, aff, raw file, dmg, e01, ewf, iso image, or the like) a partial disk source, or other data source. As such, it will be appreciated that source data that may be evaluated in accordance with various example embodiments is not limited to any one pre-defined type.

The source data to be evaluated may, for example, be located on the memory 112. As a further example, the source data may be embodied on a memory that may be inserted in a disk drive of the record recovery apparatus 102. As another example, the source data to be evaluated may be embodied on a memory that may be connected to the record recovery apparatus 102 by way of the communication interface 114 (e.g., via a Universal Serial Bus port, Bluetooth connection, serial port, or the like).

As yet another example, the source data to be evaluated may be located on an apparatus that may be accessible by the record recovery apparatus 102 by way of a network. In this regard, FIG. 3 illustrates an example of a system 300 wherein database records may be recovered from remote source data 304 over a network 306. The source data 304 may comprise any memory or other data source that may be embodied on or connected to an apparatus that may connect to the network 306 and communicate with the record recovery apparatus 302 via the network 306. The record recovery apparatus 302 may comprise an embodiment of the record recovery apparatus 102 configured to evaluate source data over a network. The network 306 may comprise one or more wireless networks (for example, a cellular network, wireless local area network, wireless personal area network, wireless metropolitan area network, and/or the like), one or more wireline networks, or some combination thereof, and in some embodiments may comprise at least a portion of the Internet.

As previously discussed, the parameter set 202 may comprise one or more target database record formats. A target database record format may comprise a description of the format of database records targeted for recovery from the source data 204. The target database record format may be described in any of a variety of manners depending on the database type, format, and/or schema of records targeted for recovery.

In some example embodiments database records having a header portion defining the respective columns of the database record may be targeted for recovery. An example of such database records are SQLite database records. Referring now to FIG. 4, FIG. 4 illustrates an example database record format including a header portion 402 defining the respective data columns of the record data area 404. The header portion may optionally include a field 406 indicating the size of the header portion 402. The header portion 402 may further include a series of variable length integers, bytes, and/or other data specifying the type of each column (Type 1, Type 2 . . . Type N) that comprises the database record. In this regard, a database record may be comprised of a series of data units, referred to as columns, that may each have a type. Example column types may include integer, float, short, double, variable size text field, Binary Large Object (BLOB), binary object, or the like. While some column types, such as an integer column, may have a fixed length, other column types may have a variable length that may vary from database record to database record. For column types that do not have a fixed length (e.g., a variable size text field, blob, or the like), the header portion 402 may further comprise an indication of the size of that column in the database record corresponding to the header portion 402. The record data area 404 may accordingly comprise a series of columns, or data units, (Data 1, Data 2 . . . Data N) corresponding to the column types and/or lengths specified in the header portion 402.

As an example, the database record format for multimedia messaging service (MMS) messages in the iPhone™ operating system may be defined by the following column name and column type pairings (column name=column type):

```
rowid=SQLNull
message_id=INTEGER
data=BLOB
part_id=INTEGER
preview_part=INTEGER
content_type=TEXT
height=INTEGER
version=INTEGER
flags=INTEGER
content_id=TEXT
content_loc=TEXT
headers=BLOB
```

Accordingly, in some example embodiments the target database record format may define a target database record header format (e.g., a target header that may be found on a targeted database record). As such, in some example embodiments, the target database record format may define a sequence of column types present in a target database record, such as may be defined in the record header for the target database record. Using the above example of the record format for the MMS database record in the iPhone™ operating system, the target database record header format that may be used to facilitate recovery of such MMS database records may be defined as:

[header-size] [Integer] [BLOB] [Integer] [Integer] [Text] [Integer] [Integer] [Integer] [Text] [Text][BLOB]

In some example embodiments, the target database record header format may further include a series of names for the respective columns. While the names of the columns may not necessarily be used to facilitate record recovery, they may be used to label recovered database records, as described further herein below.

The record recovery module 118 may be configured to determine the target database record format in any of a variety of manners depending on the embodiment. As an example, the record recovery module 118 may be configured to determine a user-defined target database record format. In this regard, for example, a user may define a target database record format as a series of data bytes, by a formula which may be translated to data bytes by the record recovery module 118, or the like.

As a further example, in some example embodiments, a user may be presented with a choice of one or more pre-defined formats, and may select a target database record format from the selection of pre-defined formats. The record recovery module 118 may accordingly be configured to determine a user selected pre-defined format. In such example embodiments, if a user selects a target database format that was not already in the selection of available pre-defined formats, the new format may be saved for later use such that it may be presented in the future as a selection option.

As still a further example, in some example embodiments, a user may provide an indication of an example database having a desired target database record format. In this regard, the user may provide an indication of a specific database file (e.g., a SQLite database file) and/or select a specific table(s) within a database file that includes database records having the desired target database record format. The record recovery module 118 may be configured to receive this indication and derive the target database record format from the indicated database. As an example, Investigator Jane Smith may want to recover short message service (SMS) messages from a smart phone, whose entire memory has been stored to a forensic disk image. Smith may have an example from a similar device of a valid SQLite database containing SMS messages. During configuration of parameters for record recovery, Smith may accordingly select the SMS table of the valid SQLite database containing SMS messages, and the record recovery module 118 may derive the target database record format from the selected SMS table.

As previously discussed, the parameter set 202 may further include a threshold confidence level. The threshold confidence level may indicate a level of accuracy required when evaluating segments of the source data for presence of database records. In this regard, in some example embodiments, the record recovery module 118 may be configured to identify and recover database records and/or fragments thereof that are not perfect matches to the target database record format. The threshold confidence level may accordingly define a degree to which a portion of the source data should match the target database record format (e.g., a probability of a match) in order to be identified and recovered by the record recovery module 118.

The threshold confidence level may be specified as a numeric value (e.g., percentage), a verbal range indicator (e.g., "High"/"Medium"/"Low") that may be translated to a numeric value or range, or the like that may be interpreted by the record recovery module 118 as specifying the desired level of accuracy when evaluating segments of data as matching the target database record format. The record recovery module 118 may be configured (e.g., by a user, software developer, device manufacturer, or the like) with a default value for the threshold confidence level. Additionally or alternatively, a user may set a desired threshold confidence level prior to initiation of a data recovery. For example, a forensic data recovery program may prompt the user to select a threshold confidence level. The record recovery module 118 may accordingly be configured to determine a user selected threshold confidence level.

The threshold confidence level may be set at a desired level (e.g., less than 100% match) to enable the recovery of partial database records, corrupted database records, record fragments, similar database record formats, and/or the like. As an example, a threshold confidence level set to a level satisfied by records that are partial matches may enable recovery of a database record that may be missing a column included in the target database record format.

As previously discussed, the parameter set 202 may include recovered data output parameters, such as a location to which to output recovered database records, a format in which to output recovered database records, and/or the like. These parameters may comprise default parameters and/or may be specified by a user. The recovered data output parameters may accordingly define a means for outputting recovered database records, such as a memory location to which recovered database records are to be saved, a printer to be used to print recovered database records, and/or the like. The recovered data output parameters may further define a format in which to output recovered database records.

Returning to FIG. 2, the record recovery module 118 may be configured to perform a recovery process 206 based on the parameter set 202 to recover database records from the source data 204. While reference 206 in FIG. 2 refers to a "forensic recovery process," it will be appreciated that database record recovery in accordance with various example embodiments may also be applied outside of the context of digital forensics, such as to aid in recovery of corrupted, accidentally deleted, or lost data. The recovery process may commence subsequent to determination of the parameter set 202. As an example a user may choose to initiate the recovery process via a user interface of a database record recovery program. In some example embodiments, if a user provides one or more parameters of the parameter set 202, the record recovery module 118 may be configured to review the user-provided parameter(s) prior to beginning the recovery process to ensure that the parameters have valid and/or expected values.

The recovery process may comprise the record recovery module 118 evaluating the source data 204 for presence of database records matching the target database record format. If a threshold confidence level is configured, evaluating the source data for the presence of database records matching the threshold database record format may comprise evaluating the source data for the presence of database records matching the target database record format to the satisfaction of the threshold confidence level. It will be appreciated that in some instances, multiple target database record formats may be defined, and, in such instances, the record recovery module 118 may be configured to evaluate the source data for presence of database records matching any of the target formats.

The record recovery module 118 may be configured to evaluate the source data by reading portions of the source data, also referred to as data chunks, and evaluating each respective portion to determine if the read portion matches (e.g., exactly or satisfies a threshold confidence level) the target database record format. For example, in an embodiment wherein the target database record format defines a target SQLite database record header format, the record recovery module 118 may evaluate a read source data portion to determine if a SQLite record header matching the target database record format may be present in the source data portion. The record recovery module 118 may read and evaluate successive portions of the source data beginning with the starting point of the source data, and continue until the endpoint of the source data is reached.

The size of respective read portions of the source data may be fixed in accordance with a configuration parameter, which may be included in the parameter set 202. Such configuration parameter may be configured by a user, software developer, hardware manufacturer, by the record recovery module 118, and/or the like. Alternatively, the size of respective read portions of the data source may vary dynamically, such as based on system performance during the recovery process.

In an instance in which the record recovery module 118 determines based on evaluation of the source data that a database record is present in the source data, the record recovery module 118 may recover the database record from the source data. It will be appreciated that the recovered database record may not necessarily be a complete database record, but rather may comprise a fragment of a database record.

In some embodiments wherein the target database record format comprises a target database record header format, for data chunks where a matching (e.g., to the satisfaction of a threshold confidence level) header is found, the expected data area of the record corresponding to the found header may be recovered. The expected data area of the record corresponding to the found header may comprise the portion of the source data immediately following the header found in the source data and having the length of the expected database record. The record recovery module 118 may be configured to determine the expected data area for recovery by calculating a record length offset corresponding to the length of the expected database record from the end of the found header. The length of the expected database record used for calculating the record length offset may be determined based at least in part on the target database record header and/or on the found header. In this regard, the length of the expected database record may comprise the sum of the lengths of the respective column types defined by the header (e.g., by the target database header format and/or by the database header found in the source data) to be included in the expected database record.

In some example embodiments, the record recovery module 118 may be configured during recovery of a database record to segment the database record into respective columns in accordance with the target database record format. In this regard, the record recovery module 118 may calculate respective column offsets based on the respective column sizes defined by the target database record header format and/or by the database record header found in the source data to enable segmentation of the recovered data portion of a database record.

Recovered database records may include record fragments, and may contain data types such as integers, text and binary data, which may represent functional data such as SMS messages, MMS messages, email messages, contact lists, and/or the like. Recovered SQLite database records may have been recovered from any of a variety of structures within a compete or incomplete SQLite file, including, for example, tables, SQLite journal files, the Write Ahead Log, and/or the like. Accordingly, recovery of SQLite database records is not limited to only records in/from tables, but may include any SQLite record or fragment that can be identified in the data source.

Referring again to FIG. 2, the record recovery module 118 may be further configured to output recovered database records, as illustrated by operation 208. In this regard, recovered database records may be saved to a designated output file or memory location, printed, sent to a designated recipient (e.g., via email), transmitted to a designated program, and/or the like. The record recovery module 118 may, for example, be configured to output each database record as it is recovered from the source data. Alternatively, the record recovery module 118 may output all recovered database records at once following completion of evaluation of the source data.

The output of recovered database records may be performed in accordance with one or more configured output parameters, such as may be specified in the parameter set 202. In some example embodiments, a recovered and output database record that is segmented into columns may be labeled with column names that may be specified in the target database record format used for recovery of the database record.

The record recovery module 118 may further support post-processing of recovered database records. Post-processing may include transformation, searching, data manipulation, or other processing applied to the recovered data after it is first recovered and output to file. Post-processing may occur with or without user interaction during and after recovery, and in some example embodiments, may be set to be performed automatically, such as by default, or in accordance with a user configuration made prior to initiation of the recovery process.

In various example embodiments, a user may be enabled to view, edit, transform, parse, manipulate, filter, and/or perform other similar operations on the recovered data. In some example embodiments, an investigator analyzing recovered data may transform date/time values to a specified format and/or time range, filter recovered data based on parameters such as a date/time range, remove or hide data containing a specific value or matching an expression or formula, search recovered data for specific values, and/or the like. Searching may be performed using a formula, regular expression or dictionary. In some example embodiments, recovered data may be exported to a desired file format compatible, such as a format compatible with forensic software.

Referring now to FIG. 5, FIG. 5 illustrates a flowchart according to an example method for database record recovery according to some example embodiments. In this regard, FIG. 5 illustrates operations that may, for example, be performed by a record recovery apparatus 102. The operations illustrated in and described with respect to FIG. 5 may, for example, be performed by, with the assistance of, and/or under the control of one or more of the processor 110, memory 112, communication interface 114, user interface 116, or record recovery module 118. Operation 500 may comprise determining a target database record format. The processor 110, memory 112, communication interface 114, user interface 116, and/or record recovery module 118 may, for example, provide means for performing operation 500. Operation 510 may comprise using the target database record format to evaluate source data for presence of database records matching the target database record format. The processor 110, memory 112, communication interface 114, and/or record recovery module 118 may, for example, provide means for performing operation 510. In an instance in which a database record is determined, based on the evaluation, to be present in the source data, operation 520 may comprise recovering the database record from the source data. The processor 110, memory 112, communication interface 114, and/or record recovery module 118 may, for example, provide means for performing operation 520. The method may optionally further include operation 530, which may comprise outputting the recovered database record to an output location. The output location may, for example, comprise a designated memory location, output file, email address, printer, and/or the like. The processor 110, memory 112, communication interface 114, user interface 116, and/or record recovery module 118 may, for example, provide means for performing operation 530.

FIG. 6 illustrates a flowchart according to another example method for database record recovery according to some example embodiments. In this regard, FIG. 6 illustrates operations that may, for example, be performed by a record recovery apparatus 102. The operations illustrated in and described with respect to FIG. 6 may, for example, be performed by, with the assistance of, and/or under the control of one or more of the processor 110, memory 112, communication interface 114, user interface 116, or record recovery module 118. Operation 600 may comprise determining a target database record format. The processor 110, memory 112, communication interface 114, user interface 116, and/or record recovery module 118 may, for example, provide means for performing operation 600. Operation 610 may comprise reading the next portion of source data to be evaluated. The processor 110, memory 112, communication interface 114, and/or record recovery module 118 may, for example, provide means for performing operation 610. Operation 620 may comprise comparing the target database record format to the read portion of source data. The processor 110, memory 112, communication interface 114, and/or record recovery module 118 may, for example, provide means for performing operation 620.

Operation 630 may comprise determining whether the comparison of operation 620 satisfies a threshold confidence level. The processor 110, memory 112, communication interface 114, and/or record recovery module 118 may, for example, provide means for performing operation 630. If it is determined at operation 630 that the comparison does not satisfy the threshold confidence level, the method may proceed to operation 650, which may comprise determining whether the end of the source data has been reached. The processor 110, memory 112, communication interface 114, and/or record recovery module 118 may, for example, provide means for performing operation 650. If the end of the source data has been reached the method may terminate, at operation 660. If, however, the end of the source data has not been reached, the method may return to operation 610, where the next portion of the source data may be read for evaluation.

In an instance in which it is determined in operation 630 that the comparison does satisfy the threshold confidence level, the method may instead proceed to operation 640, which may comprise recovering a database record from the source data. The processor 110, memory 112, communication interface 114, and/or record recovery module 118 may, for example, provide means for performing operation 640. Following operation 640, the method may proceed to operation 650, which may be performed as previously described.

FIG. 7 illustrates a flowchart according to a further example method for database record recovery according to some example embodiments. In this regard, FIG. 7 illustrates operations that may, for example, be performed by a record recovery apparatus 102 for recovering SQLite database records. The operations illustrated in and described with respect to FIG. 7 may, for example, be performed by, with the assistance of, and/or under the control of one or more of the processor 110, memory 112, communication interface 114, user interface 116, or record recovery module 118. Operation 700 may comprise determining a target SQLite record header format for a SQLite database record. The processor 110, memory 112, communication interface 114, user interface 116, and/or record recovery module 118 may, for example, provide means for performing operation 700. Operation 710 may comprise comparing the target SQLite record header format to a portion of source data. In this regard, the target SQLite record header format may be compared to the portion of source data to determine whether a database record header matching the target SQLite record header format may be present in the portion of source data. The processor 110, memory 112, communication interface 114, and/or record recovery module 118 may, for example, provide means for performing operation 710. Operation 720 may comprise determining whether the comparison of operation 710 satisfies a threshold confidence level. In this regard, if the comparison satisfies the threshold confidence level, it may be determined to the satisfaction of the threshold confidence level that there is a database record header for a database record that matches the target SQLite record header format within the portion of source data. The processor 110, memory 112, communication interface 114, and/or record recovery module 118 may, for example, provide means for performing operation 720. In an instance in which the threshold confidence level is satisfied, a database record (e.g., a database record corresponding to a header matching the target SQLite record header format) may be determined to be present in the source data, in operation 730. The processor 110, memory 112, communication interface 114, and/or record recovery module 118 may, for example, provide means for performing operation 730. Operation 740 may comprise recovering the identified database record from the source data. The processor 110, memory 112, communication interface 114, and/or record recovery module 118 may, for example, provide means for performing operation 740.

The method may optionally further comprise operation 750, which may comprise outputting the recovered database record to an output location. The output location may, for example, comprise a designated memory location, output file, email address, printer, and/or the like. The processor 110, memory 112, communication interface 114, user interface 116, and/or record recovery module 118 may, for example, provide means for performing operation 750. Although not illustrated in FIG. 7, the method may return to operation 710 such that the next portion of source data may be compared to the target SQLite header format. In this regard, one or more of operations 710-750 may be repeated until the last portion of source data has been evaluated for presence of SQLite database records on the basis of the target SQLite record header format.

FIGS. 5-7 each illustrate a flowchart of a system, method, and computer program product according to example embodiments of the invention. It will be understood that each block or step of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices (e.g., the memory 112) of a server, desktop computer, laptop computer, mobile computer, or other computing device (e.g., a record recovery apparatus 102) and executed by a processor (e.g., the processor 110) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function(s) specified in the flowchart block(s). The computer program instructions of one or more computer program products may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product.

The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method, comprising:
   determining a target database record format, comprising determining a target SQLite record header format for a SQLite database record, wherein the SQLite database record comprises any raw data, data file, or memory which is to be evaluated for presence of database records;
   using the target database record format to evaluate, by a processor, source data for presence of database records matching the target database record format, comprising:
      comparing the target SQLite record header format to a portion of the source data;
      determining whether the comparison satisfies a threshold confidence level, the threshold confidence level being set to less than 100 percent to enable recovery of data from partial database records, corrupted database records, and database record fragments; and
      in an instance in which the threshold confidence level is satisfied, determining a database record to be present in the source data; and
   in response to determining the database record is present in the source data, recovering the database record from the source data, said recovering including recovering at least one of a partial database record, a corrupted database record, and a fragment of a database record.

2. The method of claim 1, wherein the target database record format defines a sequence of column types present in a target database record.

3. The method of claim 1, wherein determining the target database record format comprises:
   receiving an indication of a database having a desired target database record format; and
   deriving the target database record format from the database having the desired target database record format.

4. The method of claim 1, wherein determining the target database record format comprises receiving a user-defined target database record format.

5. The method of claim 1, wherein the target database record format defines a target record header format, and wherein using the target database record format to evaluate source data for presence of database records matching the target database record format comprises using the target record header format to evaluate the source data for presence of a database record header matching the target record header format.

6. The method of claim 5, wherein in an instance in which a database record header matching the target record header format is determined to be present in the source data, recovering the database record comprises:
   determining, based at least in part on one or more of the target record header format or the database record header determined to be present in the source data, a portion of the source data sequentially following the database record header expected to contain the database record corresponding to the database record header; and
   recovering the determined portion.

7. The method of claim 6, wherein:
   determining the portion of the source data expected to contain the database record comprises calculating at least one column offset for the database record based at least in part on one or more of the target record header format or the database record header determined to be present in the source data.

8. The method of claim 1, wherein the target database record format defines a target format for the SQLite database record, and
   wherein using the target database record format to evaluate the source data for presence of database records matching the target database record format comprises using the target SQLite database record format to evaluate the source data for presence of SQLite database records matching the target SQLite database record format.

9. An apparatus comprising at least one processor, the at least one processor configured to cause the apparatus to at least:
   determine a target database record format by determining a target SQLite record header format for a SQLite database record, wherein the SQLite database record comprises any raw data, data file, or memory which is to be evaluated for presence of database records;
   use the target database record format to evaluate source data for presence of database records matching the target database record format, comprising:
      compare the target SQLite record header format to a portion of the source data;
      determine whether the comparison satisfies a threshold confidence level, the threshold confidence level being set to less than 100 percent to enable recovery of data from partial database records, corrupted database records, and database record fragments; and
      in an instance in which the threshold confidence level is satisfied, determining a database record to be present in the source data; and
   in response to determining the database record is present in the source data, recover the database record from the source data said recover the database record including recovering at least one of a partial database record, a corrupted database record, and a fragment of a database record.

10. The apparatus of claim 9, wherein the target database record format defines a sequence of column types present in a target database record.

11. The apparatus of claim 9, wherein the at least one processor is configured to cause the apparatus to determine the target database record format at least in part by:

receiving an indication of a database having a desired target database record format; and deriving the target database record format from the database having the desired target database record format.

12. The apparatus of claim 9, wherein the at least one processor is configured to cause the apparatus to determine the target database record format at least in part by receiving a user-defined target database record format.

13. The apparatus of claim 9, wherein the target database record format defines a target record header format, and wherein the at least one processor is configured to cause the apparatus to use the target database record format to evaluate source data for presence of database records matching the target database record format at least in part by using the target record header format to evaluate the source data for presence of a database record header matching the target record header format.

14. The apparatus of claim 13, wherein in an instance in which a database record header matching the target record header format is determined to be present in the source data, the at least one processor is configured to cause the apparatus to recover the database record at least in part by:

determining, based at least in part on one or more of the target record header format or the database record header determined to be present in the source data, a portion of the source data sequentially following the database record header expected to contain the database record corresponding to the database record header; and recovering the determined portion.

15. The apparatus of claim 14, wherein the at least one processor is configured to cause the apparatus to determine the portion of the source data expected to contain the database record at least in part by calculating at least one column offset for the database record based at least in part on one or more of the target record header format or the database record header determined to be present in the source data.

16. The apparatus of claim 9, wherein the target database record format defines a target format for the SQLite database record, and wherein the at least one processor is configured to cause the apparatus to use the target database record format to evaluate the source data for presence of database records matching the target database record format by using the target SQLite database record format to evaluate the source data for presence of SQLite database records matching the target SQLite database record format.

17. A computer program product comprising at least one non-transitory computer-readable storage medium having computer-readable program instructions stored therein, the computer-readable program instructions comprising:

program instructions configured to determine a target database record format by determining a target SQLite record header format for a SQLite database record, wherein the SQLite database record comprises any raw data, data file, or memory which is to be evaluated for presence of database records;

program instructions configured to use the target database record format to evaluate source data for presence of database records matching the target database record format, comprising:

program instructions configured to compare the target SQLite record header format to a portion of the source data;

program instructions configured to determine whether the comparison satisfies a threshold confidence level, the threshold confidence level being set to less than 100 percent to enable recovery of data from partial database records, corrupted database records, and database record fragments; and program instructions configured to, in an instance in which the threshold confidence level is satisfied, determine a database record to be present in the source data; and program instructions configured to, in response to determining the database record is present in the source data, recover the database record from the source data, the recover the database record including recovering at least one of a partial database record, a corrupted database record, and a fragment of a database record.

* * * * *